US011908606B2

(12) United States Patent
Yoshioka et al.

(10) Patent No.: US 11,908,606 B2
(45) Date of Patent: Feb. 20, 2024

(54) INDUCTOR ARRAY COMPONENT

(71) Applicant: Murata Manufacturing Co., Ltd., Kyoto-fu (JP)

(72) Inventors: Yoshimasa Yoshioka, Nagaokakyo (JP); Naoya Noo, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 641 days.

(21) Appl. No.: 17/076,245

(22) Filed: Oct. 21, 2020

(65) Prior Publication Data

US 2021/0134516 A1 May 6, 2021

(30) Foreign Application Priority Data

Nov. 6, 2019 (JP) ................................ 2019-201834

(51) Int. Cl.

| | |
|---|---|
| ***H01F 27/28*** | (2006.01) |
| ***H01F 41/02*** | (2006.01) |
| ***H01F 41/04*** | (2006.01) |
| ***H01F 27/255*** | (2006.01) |

(52) U.S. Cl.

CPC ....... *H01F 27/2804* (2013.01); *H01F 27/255* (2013.01); *H01F 41/0246* (2013.01); *H01F 41/041* (2013.01); *Y10T 428/32* (2015.01)

(58) Field of Classification Search

None

See application file for complete search history.

(56) References Cited

U.S. PATENT DOCUMENTS 6,191,667 B1 * 2/2001 Takenaka ............ H01F 17/0006 336/232
2009/0128276 A1 * 5/2009 Horowy ................ H01F 17/062 336/96
2019/0074125 A1 * 3/2019 Yoshioka ................ H01F 27/29
2019/0206611 A1 * 7/2019 Matsumoto ............. H01F 17/04

(Continued)

FOREIGN PATENT DOCUMENTS

JP 2000021633 A 1/2000
JP 2019-046993 A 3/2019
JP 2019-121780 A 7/2019

OTHER PUBLICATIONS

An Office Action; "Notice of Reasons for Refusal," mailed by the Japanese Patent Office dated Apr. 19, 2022, which corresponds to Japanese Patent Application No. 2019-201834 and is related to U.S. Appl. No. 17/076,245 with English language translation.

*Primary Examiner* — Kevin M Bernatz

(74) *Attorney, Agent, or Firm* — Studebaker & Brackett PC

(57) ABSTRACT

An inductor array component including an element body and a first straight wiring line and a second straight wiring line that are arranged on the same plane inside the element body. The element body includes a first region that is located on a first side of the first straight wiring line or the second straight wiring line in a normal direction that is normal to the plane, a second region that is located on a second side of the first straight wiring line or the second straight wiring line in the normal direction that is normal to the plane, and a third region that is located between the first straight wiring line and the second straight wiring line. The greater one out of the magnetoresistance of the first region and the magnetoresistance of the second region is greater than or equal to the magnetoresistance of the third region.

20 Claims, 2 Drawing Sheets

(56) References Cited

U.S. PATENT DOCUMENTS

| | | | | |
|---|---|---|---|---|
| 2020/0365315 | A1* | 11/2020 | Kim | H01F 17/04 |
| 2021/0005379 | A1* | 1/2021 | Yeo | H01F 27/02 |
| 2022/0199313 | A1* | 6/2022 | Park | H01F 27/2847 |

* cited by examiner

INDUCTOR ARRAY COMPONENT

CROSS-REFERENCE TO RELATED APPLICATIONS

This application claims benefit of priority to Japanese Patent Application No. 2019-201834, filed Nov. 6, 2019, the entire content of which is incorporated herein by reference.

BACKGROUND

Technical Field

The present disclosure relates to an inductor array component.

Background Art

Japanese Unexamined Patent Application Publication No. 2000-21633 discloses an inductor array component of the related art. The inductor array component includes a multilayer body formed by stacking insulating sheets composed of ferrite or the like and having a plurality of inductor wiring lines (inner conductors) provided on the surfaces thereof. In this inductor array component, variations in inductance are reduced by compensating for differences in the electrical resistance of magnetic paths of magnetic flux generated by the plurality of inductor wiring lines by giving the inductor wiring lines different shapes.

SUMMARY

In the inductor array component disclosed in Japanese Unexamined Patent Application Publication No. 2000-21633, it is assumed that the outer shape of the multilayer body is reduced in size without changing the width of the region located between the individual inductor wiring lines, but it is preferable to also include consideration of the width of this region in the elements that are adjusted. Furthermore, only size reduction in the planar directions is considered in the inductor array component disclosed in Japanese Unexamined Patent Application Publication No. 2000-21633, but it is preferable to also consider size reduction in the thickness direction, i.e., thickness reduction, as the methods used to mount inductor array components become increasingly diverse.

Accordingly, the present disclosure provides an inductor array component that enables thickness reduction to be effectively realized while also taking into account a region located between wiring lines.

One embodiment of the present disclosure provides an inductor array component that includes an element body and a first straight wiring line and a second straight wiring line that are arranged on the same plane inside the element body. The element body includes a first region that is located on a first side of the first straight wiring line or the second straight wiring line in a normal direction that is normal to the plane, a second region that is located on a second side of the first straight wiring line or the second straight wiring line in the normal direction that is normal to the plane, and a third region that is located between the first straight wiring line and the second straight wiring line. The greater one out of a magnetoresistance of the first region and a magnetoresistance of the second region is greater than or equal to a magnetoresistance of the third region.

In this case, since the thickness is no larger than necessary on the side where the thickness is smaller, i.e., on the side having the greater magnetoresistance out of the first region and the second region of the element body, thickness reduction can be effectively realized.

In the above-described inductor array component, B1 is a thickness of the first region, B2 is a thickness of the second region, A is a width of the third region, $\mu B_1$ is an effective relative magnetic permeability of the first region, $\mu_{B2}$ is an effective relative magnetic permeability of the second region, $\mu_A$ is an effective relative magnetic permeability of the third region, T is the thickness of the inductor array component, w is a width which is not smaller one out of the width of the first straight wiring line and the width of the second straight wiring line, and t is a thickness which is not smaller one out of the thickness of the first straight wiring line and the thickness of the second straight wiring line. Accordingly, when $B1 \leq (\mu_{B2}/\mu_{B1}) \times B2$, $$B1 \leq \frac{w}{t} \times \frac{\mu_A}{\mu_{B1}} \times A \qquad \text{formula (1)}$$

may be satisfied, when $B1 > (\mu_{B2}/\mu_{B1}) \times B2$, $$B2 \leq \frac{w}{t} \times \frac{\mu_A}{\mu_{B2}} \times A \qquad \text{formula (2)}$$

may be satisfied, and in both cases, $$\frac{T}{10} \times \frac{1}{2} \leq B1 \text{ and } \frac{T}{10} \times \frac{1}{2} \leq B2 \qquad \text{formula (3)}$$

may be satisfied.

In this case, as a result of setting the thickness B1 of the first region to be less than or equal to $(w/t) \times (\mu_A/\mu_{B1}) \times A$ as illustrated in formula (1) or the thickness B2 of the second region to be less than or equal to $(w/t) \times (\mu A/\mu_{B2}) \times A$ as illustrated in formula (2), the side having the greater magnetoresistance out of the first region and the second region of the element body is made no thicker than necessary with little effect on the magnetic characteristics and without having a magnetoresistance that is smaller than the magnetoresistance of the third region, and consequently thickness reduction can be more effectively realized.

Furthermore, the first region or the second region can be secured even taking processing variations into account by setting the thickness B1 of the first region or the thickness B2 of the second region to be greater than or equal to $(T/10) \times (1/2)$ as illustrated in formula (3). Therefore the straight wiring lines can be prevented from becoming exposed and forming open magnetic paths.

Furthermore, in the above-described inductor array component, the thickness T of the inductor array component may be less than or equal to 0.3 mm.

In this case, since there is no excess thickness when the thickness T is less than or equal to 0.3 mm, the first region or the second region becomes magnetically saturated more easily than the third region and the effect achieved by making a thickness no larger than necessary is effectively realized. Furthermore, since the inductor array component is thin, it is possible to embed the inductor array component in a substrate, for example.

In addition, in the above-described inductor array component, the thickness B1 of the first region and the thickness B2 of the second region may be equal to each other, the effective relative magnetic permeability $\mu_{B1}$ of the first region and the effective relative magnetic permeability $\mu_{B2}$ of the second region may be equal to each other, and both formula (1) and formula (2) may be satisfied.

In this case, since the first region and the second region are both made no thicker than necessary with little effect on the magnetic characteristics, thickness reduction can be more effectively realized.

Furthermore, in the above-described inductor array component, the width of the first straight wiring line and the width of the second straight wiring line may be equal to each other and the thickness of the first straight wiring line and the thickness of the second straight wiring line may be equal to each other.

In this case, the first region or the second region is made no thicker than necessary with little effect on the magnetic characteristics for both the first straight wiring line and the second straight wiring line, and therefore thickness reduction can be more effectively realized.

In addition, the above-described inductor array component may further include an insulator that is arranged in at least part of a region between the first straight wiring line and the second straight wiring line.

In this case, the degree of insulation between the first straight wiring line and the second straight wiring line can be improved.

Furthermore, in the above-described inductor array component, the first straight wiring line and the second straight wiring line may have side surfaces that face each other, and the insulator may contact the side surface of at least one out of the first straight wiring line and the second straight wiring line and a width of the part of the insulator that contacts the side surface may be smaller than the width of the third region.

In this case, the degree of insulation between the first straight wiring line and the second straight wiring line can be further improved. In addition, since the volume of the non-insulator part of the third region of the element body is secured, an inductor array component in which the efficiency with which the inductance is obtained is high can be provided.

Furthermore, in the above-described inductor array component, the first straight wiring line and the second straight wiring line may each have an upper surface and a lower surface, the insulator may contact at least one out of the upper surface and the lower surface, and a thickness of the part of the insulator that contacts the at least one out of the upper surface and the lower surface may be smaller than the thickness B1 of the first region and the thickness B2 of the second region.

In this case, the degree of insulation between the first straight wiring line and the second straight wiring line can be further improved. Furthermore, since the volumes of the non-insulator parts of the first region and the second region of the element body are secured, an inductor array component in which the efficiency with which the inductance is obtained is high can be provided.

Furthermore, in the above inductor array component, the insulator may be composed of an epoxy resin, a phenolic resin, a polyimide resin, an acrylic resin, a vinyl ether resin or a mixture of any of these resins.

In this case, the adhesion of at least one out of the first straight wiring line and the second straight wiring line to the element body can be improved by using a prescribed insulating organic resin as the element body. In addition, these insulating organic resins are softer than inorganic insulators and can therefore provide the element body with flexibility and increase the mechanical strength of the inductor array component against external stresses.

Furthermore, in the above-described inductor array component, the first region, the second region, and the third region may be composed of the same magnetic material.

In this case, since the first region, the second region, and the third region are composed of the same magnetic material, the cost can be reduced and mass production is facilitated. Furthermore, since the element body has the same mechanical strength in the first region, the second region, and the third region, differences in stress are unlikely to occur inside the inductor array component and the occurrence of bending or deformation of the inductor array component can be suppressed.

In addition, in the above-described inductor array component, the first straight wiring line and the second straight wiring line may be each composed of a plurality of conductor layers stacked in the normal direction.

In this case, the inductance can be increased.

Furthermore, the above-described inductor array component may further include a coating layer on a main surface of the element body.

In this case, an insulating property of a main surface of the element body can be secured, for example, the degree of insulation between outer terminals on the main surface can be increased by providing the coating layer on the main surface of the element body.

In addition, the above-described inductor array component may further include an outer terminal on a main surface of the element body, and the outer terminal may be composed of at least one out of Cu, Ag, Ni, Au, and Sn or an alloy of any of these metals.

In this case, the electrical conductivity of the outer terminal is improved as a result of the outer terminal including Cu or Ag, which have a low electrical resistance, and thus the quality of the inductor array component is improved. A barrier property of the outer terminal with respect to solder is improved by inclusion of Ni in the outer terminal and thus the quality of the inductor array component is improved. Wettability of the outer terminal can be ensured and stable mounting of the inductor array component can be realized as a result of including Au or Sn, which have corrosion resistance, in the outer terminal.

Furthermore, in the above-described inductor array component, the element body may be a sintered body.

In this case, the inductor array component can be easily manufactured.

In addition, in the above inductor array component, the element body may include a resin and a magnetic powder contained in the resin.

In this case, the inductance can be improved by the inclusion of the magnetic powder.

In addition, in the above-described inductor array component, the element body may further include a non-magnetic powder composed of an insulating material.

In this case, the insulating properties of the element body can be increased when the element body includes a non-magnetic powder composed of an insulating material (for example, silica filler).

In addition, in the above-described inductor array component, the magnetic powder may include a ferrite powder.

In this case, the inductance of the inductor array component can be increased by using a ferrite powder as the magnetic powder. The insulating properties of element body can be increased since a ferrite powder has a higher insulating property than a metal magnetic powder.

Furthermore, in the above-described inductor array component, the resin may be composed of at least one out of an epoxy resin and an acrylic resin.

In this case, the insulating properties of the element body can be improved. In addition, the mechanical strength of the element body can be improved due to the stress relaxation effect provided by the resin.

According to some embodiments of the present disclosure, an inductor array component can be provided that enables thickness reduction to be effectively realized while taking into account a region located between wiring lines.

Other features, elements, characteristics and advantages of the present disclosure will become more apparent from the following detailed description of some embodiments of the present disclosure with reference to the attached drawings.

DETAILED DESCRIPTION

Hereafter, inductor array components according to aspects of the present disclosure will be described in detail by referring to the illustrated embodiments. The drawings include schematic drawings and may not reflect the actual dimensions and proportions.

First Embodiment

Configuration

Figure 1A:
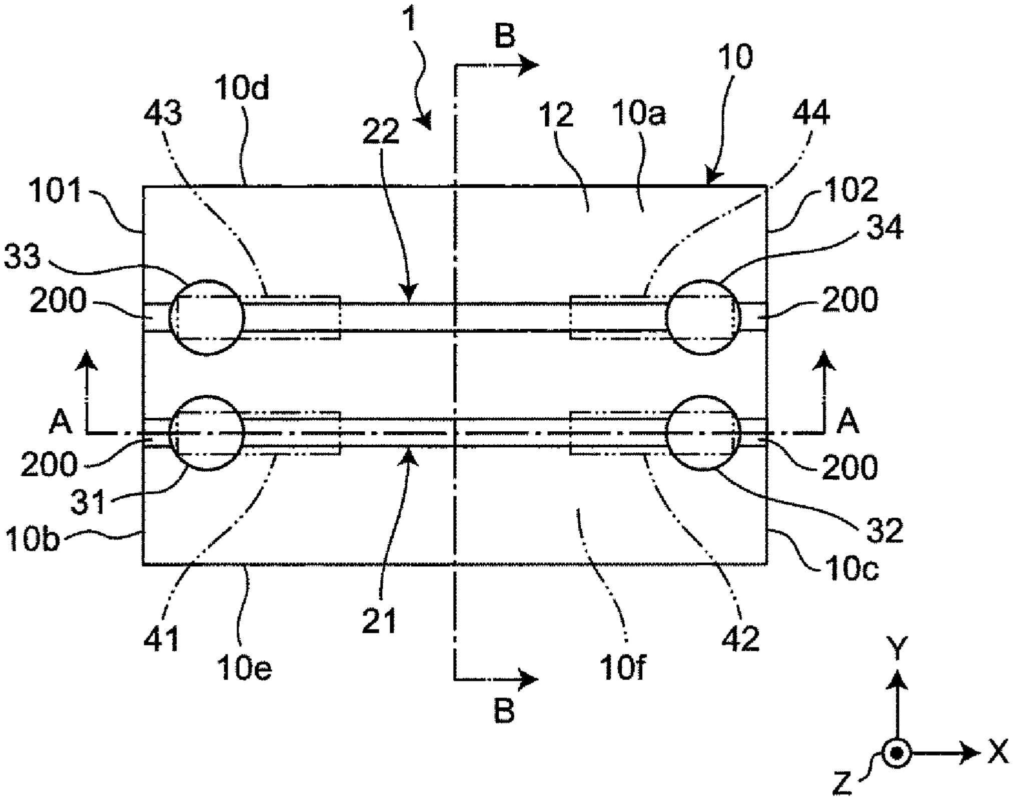
FIG. 1A is a see-through plan view illustrating an inductor array component according to a first embodiment.
Figure 1B:
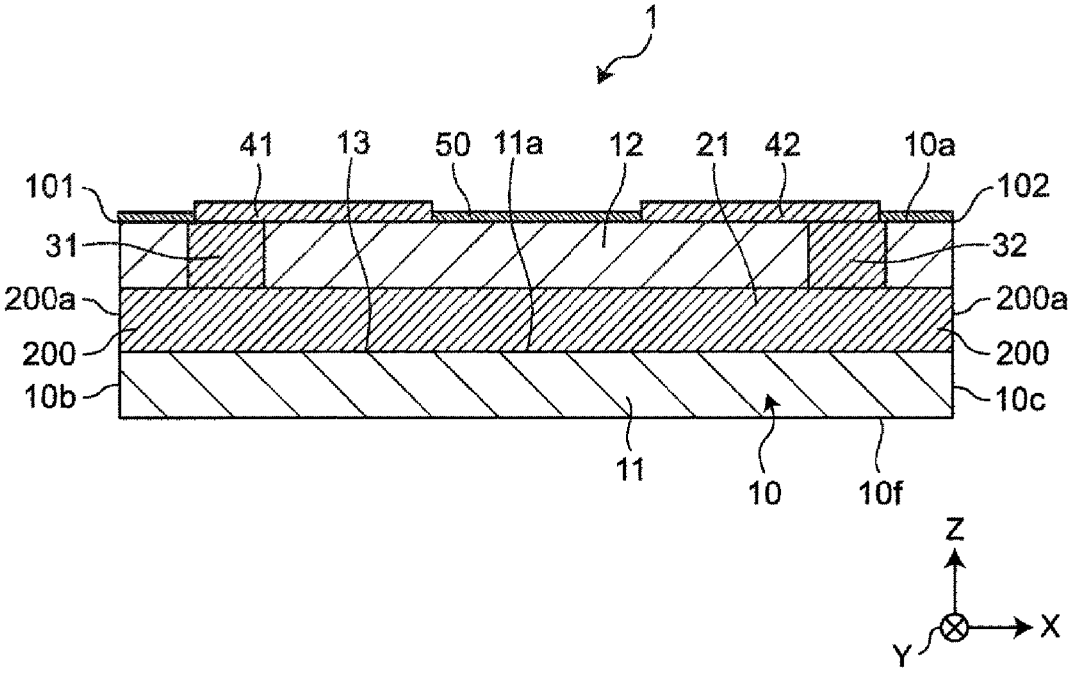
FIG. 1B is a sectional view taken along line A-A in FIG. 1A.

FIG. 1A is a see-through plan view illustrating an inductor array component according to a first embodiment. FIG. 1B is a sectional view taken along line A-A in FIG. 1A.

An inductor array component 1 is for example a component that is mounted in an electronic appliance such as a personal computer, a DVD player, a digital camera, a TV, a mobile phone, or an in-car electronic appliance and has a substantially rectangular parallelepiped shape on the whole. However, the shape of the inductor array component 1 is not particularly limited and the inductor array component 1 may instead substantially have a cylindrical or polygonal columnar shape, a truncated cone shape, or a polygonal truncated pyramidal shape.

As illustrated in FIGS. 1A and 1B, the inductor array component 1 includes a substantially rectangular parallelepiped shaped element body 10 in which magnetic layers 11 and 12 are stacked, a first straight wiring line 21 and a second straight wiring line 22 that are arranged on the same plane inside the element body 10, outer terminals 41 to 44 and a coating layer 50 that are provided on a first main surface 10*a* of the element body 10, and columnar wiring lines 31 to 34 that electrically connect the straight wiring lines 21 and 22 and the outer terminals 41 to 44 to each other. In this case, when the direction in which the magnetic layers 11 and 12 are stacked is regarded as a thickness direction of the inductor array component 1, the outer surfaces of the inductor array component 1 include the first main surface 10*a* and a second main surface 10*f*, which have substantially rectangular shapes, that are perpendicular to the thickness direction and face each other in the thickness direction. In addition, among directions perpendicular to the thickness direction, when a direction in which the first straight wiring line 21 and the second straight wiring line 22 extend is regarded as a length direction of the inductor array component 1 and a direction that is perpendicular to both the thickness direction and the length direction is regarded as a width direction of the inductor array component 1, the outer surfaces of the inductor array component 1 include a first side surface 10*b* and a second side surface 10*c* that are connected between the first main surface 10*a* and the second main surface 10*f* and face each other and are parallel to the width direction and a third side surface 10*d* and a fourth side surface 10*e* that are connected between the first side surface 10*b* and the second side surface 10*c* and face each other and are parallel to the length direction. In the figures, the thickness direction of the inductor array component 1 is regarded as a Z direction with the positive Z direction being the direction toward the upper side and the negative Z direction being the direction toward the lower side. In a plane of the inductor array component 1 perpendicular to the Z direction, the length direction of the inductor array component 1 is regarded as an X direction and the width direction of the inductor array component 1 is regarded as a Y direction. Furthermore, a dimension in the length direction (X direction) is referred to as a "length", a dimension in the width direction (Y direction) is referred to as a "width", and a dimension in the thickness direction (Z direction) is referred to as a "thickness". In the inductor array component 1, the direction of the long sides and the direction of the short sides of the substantially rectangular shape of the first main surface 10*a* respectively match the length direction (X direction) and the width direction (Y direction), but the directions of the sides are not limited to this configuration. For example, in the case where the first straight wiring line 21 and the second straight wiring line 22 extend in the direction of the short sides of the first main surface 10*a*, the direction of the short sides of the first main surface 10*a* and the direction of the long sides of the first main surface 10*a* will respectively match the length direction (X direction) and the width direction (Y direction).

The first main surface 10*a* has a first end edge 101 and a second end edge 102 that extend in straight lines corresponding to the short sides of the substantially rectangular shape of the first main surface 10*a*. The first end edge 101 and the second end edge 102 are the end edges of the first main surface 10*a* that respectively adjoin the first side surface 10*b* and the second side surface 10*c* of the element body 10. The first side surface 10*b* and the second side surface 10*c* of the element body 10 are surfaces of the element body 10 that extend along the Y direction and coincide with the first end edge 101 and the second end edge 102 when looking in a direction perpendicular to the first main surface 10*a* of the element body 10. However, due to the presence of curved or sloping surfaces between the first main surface 10*a* and the first and second side surfaces 10*b* and 10*c*, the first and second side surfaces 10*b* and 10*c* do not necessarily respectively coincide with the first and second end edges 101 and 102. The third side surface 10*d* and the fourth side surface 10*e* are surfaces of the element body 10 that extend along the X direction when looking in a direction perpendicular to the first main surface 10*a* of the element body 10.

The element body 10 has a multilayer structure (two-layer structure) consisting of the plurality of magnetic layers 11 and 12. Specifically, the element body 10 includes the first magnetic layer 11 and the second magnetic layer 12, which is arranged on an upper surface 11*a* of the first magnetic layer 11 and covers the first straight wiring line 21 and the second straight wiring line 22. The first main surface 10*a* of the element body 10 corresponds to the upper surface of the second magnetic layer 12. In addition, the first and second magnetic layers 11 and 12 may be each composed of a plurality of layers. For example, the second magnetic layer 12 may be composed of a first layer that is the same layer as the first and second straight wiring line 21 and 22 and a second layer that is disposed on top of the first layer. Although the element body 10 has a multilayer structure consisting of a plurality of magnetic layers, the element body 10 is not limited to this configuration. The element body 10 may have a one-layer structure consisting of at least only a magnetic layer. Furthermore, although the element body 10 has a multilayer structure consisting of a plurality of magnetic layers, the element body 10 may appear to have a one-layer structure due to the interfaces between the layers disappearing or becoming impossible to discern during the manufacturing process.

The element body 10 is a sintered body consisting of the plurality of magnetic layers 11 and 12. When the element body 10 is a sintered body, the inductor array component 1 can be easily manufactured. The sintered body, for example, is composed of a Ni—Zn ferrite, a Mn—Zn ferrite, willemite, alumina, or glass. The sintered body is for example manufactured using a sheet stacking method or a printing stacking method in the method of manufacturing the inductor array component 1, which will be described later.

Note that although the element body 10 is a sintered body, the element body 10 is not limited to this configuration. The element body 10 may include a resin and a magnetic powder contained in the resin. In other words, the first magnetic layer 11 and the second magnetic layer 12 may be magnetic resin layers composed of a resin containing a metal magnetic powder. The resin is for example an organic insulating material consisting of an epoxy resin, an acrylic resin, bismaleimide, a liquid crystal polymer, polyimide, or the like. Among these resins, the resin preferably consists of at least one out of an epoxy resin and an acrylic resin. When the resin consists of at least one out of an epoxy resin and an acrylic resin, the insulating properties of the element body 10 can be improved. In addition, the mechanical strength of the element body 10 can be improved due to the stress relaxation effect provided by the resin.

In the case where the element body 10 contains a magnetic powder, the inductance of the inductor array component 1 can be improved. The magnetic powder is for example a ferrite powder or a metal magnetic powder such as NiZn- or MnZn-based powders. The inductance of inductor array component 1 can be increased by using a ferrite powder as the magnetic powder (due to the magnetic powder containing a ferrite powder). In addition, the insulating properties of element body 10 can be increased since a ferrite powder has a higher insulating property than a metal magnetic powder. The metal magnetic powder is for example an FeSi alloy such as FeSiCr, an FeCo alloy, an Fe alloy such as NiFe, or an amorphous alloy of these alloys or a mixture of any of these materials. The content of the magnetic powder preferably substantially lies in a range from 20 to 70 Vol % of the entire magnetic layer. The average particle diameter of the magnetic powder substantially lies in a range from 0.1 μm to 5 μm, for example. When manufacturing the inductor array component 1, the average particle diameter of the magnetic powder can be calculated as a particle diameter equivalent to an integrated value of 50% in a particle size distribution obtained by laser diffraction and scattering. In the completed state of the inductor array component 1, the average particle diameter of the magnetic powder is measured using an SEM image of a cross section extending through the center of the element body 10. Specifically, the area of each magnetic powder particle is measured and calculated from the circle equivalent diameter in an SEM image having a magnification such that at least fifteen magnetic powder particles can be recognized, and the arithmetic mean value of these diameters is taken as the average particle diameter of the magnetic powder. In the case where the average particle diameter of the magnetic powder is less than or equal to 5 μm, the direct current superposition characteristic is improved and iron loss at radio frequencies can be reduced by the fine powder. Note that the element body 10 may include both a ferrite powder and a metal magnetic powder as the magnetic powder.

The element body 10 may further include a non-magnetic powder consisting of an insulating material. If the element body 10 includes a non-magnetic powder consisting of an insulating material (for example, a silica filler), the insulating properties of the element body 10 can be improved.

The first straight wiring line 21 and the second straight wiring line 22 are arranged on the same plane (first plane 13) inside the element body 10. As a result, a low profile can be realized for the inductor array component 1. More specifically, the first plane 13 corresponds to the upper surface 11*a* of the first magnetic layer 11 (the first plane 13 will be described in more detail later). The first straight wiring line 21 and the second straight wiring line 22 are formed only on the upper side the first magnetic layer 11, that is, formed only on the upper surface 11*a* of the first magnetic layer 11 and are covered by the second magnetic layer 12. The first straight wiring line 21 and the second straight wiring line 22 of the inductor array component 1 have completely identical shapes, but the wiring lines may instead have different shapes from each other.

The first and second straight wiring lines 21 and 22 are arranged so as to not overlap and so as to be parallel to each other when viewed in the Z direction. The meaning of "parallel" is not limited to exactly parallel and also includes "substantially parallel" taking into account a realistic range of variations.

The first and second straight wiring lines 21 and 22 have substantially straight line shapes not including any curved parts when viewed in the Z direction. That is, the first and second straight wiring lines 21 and 22 are substantially straight-line-shaped wiring lines. However, these straight line shapes are not limited to being strictly straight line shapes and may include some curved or meandering shapes. In this case, the directions of extension of the first and second straight wiring lines 21 and 22 (length direction) would be determined from the overall straight line shapes ignoring any curved or meandering shapes. For example, the directions of straight lines connecting first ends and second ends of the first and second straight wiring lines 21 and 22 may be taken to be the directions in which the first and second straight wiring lines 21 and 22 extend.

The thicknesses of the first and second straight wiring line 21 and 22 preferably substantially lie in a range from 40 μm to 120 μm, for example. As an example of the first and second straight wiring lines 21 and 22, the first and second straight wiring lines 21 and 22 may have a thickness of 45

μm, a wiring line width of 40 μm, and an inter-wiring-line spacing (width of third region described later) of 10 μm. The width of the third region preferably lies in a range from 3 μm to 20 μm.

The first and second straight wiring lines 21 and 22 are composed of an electrically conductive material, and for example are composed of a metal material having a low electrical resistance such as Cu, Ag, or Au. In this embodiment, the inductor array component 1 only includes one layer of the first and second straight wiring lines 21 and 22 and a low profile can be realized for the inductor array component 1.

The first and second straight wiring lines 21 and 22 may be each formed of one conductor layer or may be each formed of a plurality of conductor layers stacked in a normal direction. In the case where the first and second straight wiring lines 21 and 22 are each formed of a plurality of conductor layers stacked in the normal direction, the inductance of the inductor array component 1 can be increased.

A first end and a second end of the first straight wiring line 21 are electrically connected to the first columnar wiring line 31 and the second columnar wiring line 32, which are positioned toward the outside. In other words, the first straight wiring line 21 has pad portions at both ends thereof, the pad portions having a larger line width than the straight-line-shaped portion of the first straight wiring line 21. The first straight wiring line 21 is directly connected to the first and second columnar wiring lines 31 and 32 at these pad portions.

Similarly, a first end and a second end of the second straight wiring line 22 are electrically connected to the third columnar wiring line 33 and the fourth columnar wiring line 34, which are positioned toward the outside. In other words, the second straight wiring line 22 has pad portions at both ends thereof, the pad portions having a larger line width than the straight-line-shaped portion of the second straight wiring line 22. The second straight wiring line 22 is directly connected to the third and fourth columnar wiring lines 33 and 34 at these pad portions.

The first to fourth columnar wiring lines 31 to 34 extend in the Z direction from the straight wiring lines 21 and 22 and penetrate through the inside of the second magnetic layer 12. The first columnar wiring line 31 extends upward from the upper surface of one end of the first straight wiring line 21 and an end surface of the first columnar wiring line 31 is exposed from the first main surface 10*a* of the element body 10. The second columnar wiring line 32 extends upward from the upper surface of the other end of the first straight wiring line 21 and an end surface of the second columnar wiring line 32 is exposed from the first main surface 10*a* of the element body 10. The third columnar wiring line 33 extends upward from the upper surface of one end of the second straight wiring line 22 and an end surface of the third columnar wiring line 33 is exposed from the first main surface 10*a* of the element body 10. The fourth columnar wiring line 34 extends upward from the upper surface of the other end of the second straight wiring line 22 and an end surface of the fourth columnar wiring line 34 is exposed from the first main surface 10*a* of the element body 10.

In other words, the first to fourth columnar wiring lines 31 to 34 extend in substantially straight lines from the first straight wiring line 21 and the second straight wiring line 22 to the end surfaces thereof that are exposed from the first main surface 10*a* in a direction perpendicular to the end surfaces. This enables the first outer terminal 41, the second outer terminal 42, the third outer terminal 43, and the fourth outer terminal 44 and the first straight wiring line 21 and the second straight wiring line 22 to be connected to each other across shorter distances and as a result a lower resistance and a higher inductance can be realized for the inductor array component 1. The first to fourth columnar wiring lines 31 to 34 are composed of an electrically conductive material and for example are composed of the same material as the straight wiring lines 21 and 22.

The first to fourth outer terminals 41 to 44 are provided on the first main surface 10*a* of the element body 10 (upper surface of second magnetic layer 12). The first outer terminal 41 and the third outer terminal 43 are arrayed along the first side surface 10*b* of the element body 10 and the second outer terminal 42 and the fourth outer terminal 44 are arrayed along the second side surface 10*c* of the element body 10 in a plan view of the inductor array component 1 in the Z direction. The direction in which the first outer terminal 41 and the third outer terminal 43 are arrayed taken to be a direction that connects the center of the first outer terminal 41 and the center of the third outer terminal 43 and the direction in which the second outer terminal 42 and the fourth outer terminal 44 are arrayed is taken to be a direction that connects the center of the second outer terminal 42 and the center of the fourth outer terminal 44.

The first outer terminal 41 contacts the end surface of the first columnar wiring line 31 that is exposed from the first main surface 10*a* of the element body 10, and is electrically connected to the first columnar wiring line 31. Thus, the first outer terminal 41 is electrically connected to one end of the first straight wiring line 21. The second outer terminal 42 contacts the end surface of the second columnar wiring line 32 that is exposed from the first main surface 10*a* of the element body 10, and is electrically connected to the second columnar wiring line 32. Thus, the second outer terminal 42 is electrically connected to the other end of the first straight wiring line 21. Similarly, the third outer terminal 43 contacts an end surface of the third columnar wiring line 33, is electrically connected to the third columnar wiring line 33, and is thus electrically connected to one end of the second straight wiring line 22. The fourth outer terminal 44 contacts an end surface of the fourth columnar wiring line 34, is electrically connected to the fourth columnar wiring line 34, and is thus electrically connected to the other end of the second straight wiring line 22.

The first to fourth outer terminals 41 to 44 are composed of an electrically conductive material. The conductive material is, for example, at least one out of Cu, Ag, Ni, Au, and Sn, or an alloy of any of these metals. The electrical conductivity of the first to fourth outer terminals 41 to 44 is improved and the quality of the inductor array component 1 is improved by inclusion of Cu or Ag, which have a low electrical resistance, in the first to fourth outer terminals 41 to 44. A barrier property of the first to fourth outer terminals 41 to 44 with respect to solder is improved by inclusion of Ni in the first to fourth outer terminals 41 to 44 and the quality of the inductor array component 1 is thus improved. Wettability of the first to fourth outer terminals 41 to 44 can be ensured and stable mounting of the inductor array component 1 can be realized by inclusion of Au or Sn, which have corrosion resistance, in the first to fourth outer terminals 41 to 44. Furthermore, the first to fourth outer terminals 41 to 44 may be composed of multilayer metal films in which a plurality of metal films composed of any of these materials are stacked. Such a multilayer metal film is composed of a plurality, i.e., two or more metal films, and for example is a metal film having a three-layer structure consisting of Cu which has low electrical resistance and excellent stress resistance, Ni which has excellent corrosion resistance, and Au which has excellent solder wettability and reliability stacked in this order in the direction toward the outside.

The first to fourth outer terminals 41 to 44 protrude upwards beyond the coating layer 50. In other words, the thicknesses of first to fourth outer terminals 41 to 44 are larger than the film thickness of the coating layer 50, and as a result the mounting stability can be improved when the inductor array component 1 is mounted.

The coating layer 50 is provided on the parts of the first main surface 10*a* of the element body 10 where the first to fourth outer terminals 41 to 44 are not provided. In other words, the element body 10 is provided with the coating layer 50 on the main surface 10*a* thereof. When the inductor array component 1 is provided with the coating layer 50 on the main surface 10*a* of the element body 10 in this way, an insulating property of the main surface 10*a* of the element body 10 can be secured, for example, the degree of insulation between the first outer terminal 41 and the second outer terminal 42 can be increased.

However, the coating layer 50 may overlap the first to fourth outer terminals 41 to 44 with the edges of the first to fourth outer terminals 41 to 44 being raised up on top of the coating layer 50. The coating layer 50 is for example composed of a resin material having a high electrical insulating property such as an acrylic resin, an epoxy resin, or polyimide. Thus, the degree of insulation between the first to fourth outer terminals 41 to 44 can be improved. Furthermore, the coating layer 50 takes the place of a mask used when forming the patterns of the first to fourth outer terminals 41 to 44 and manufacturing efficiency is improved. In addition, for example, when the metal magnetic powder is exposed from the element body 10, the coating layer 50 can prevent the metal magnetic powder from being exposed to the outside by covering the exposed metal magnetic powder. Note that the coating layer 50 may contain a filler composed of an insulating material.

In the inductor array component 1, the parts of the end surface of the first columnar wiring line 31 that does not contact the first outer terminal 41 and the parts of the end surface of the third columnar wiring line 33 that does not contact the third outer terminal 43 are covered by the coating layer 50.

Figure 1C:
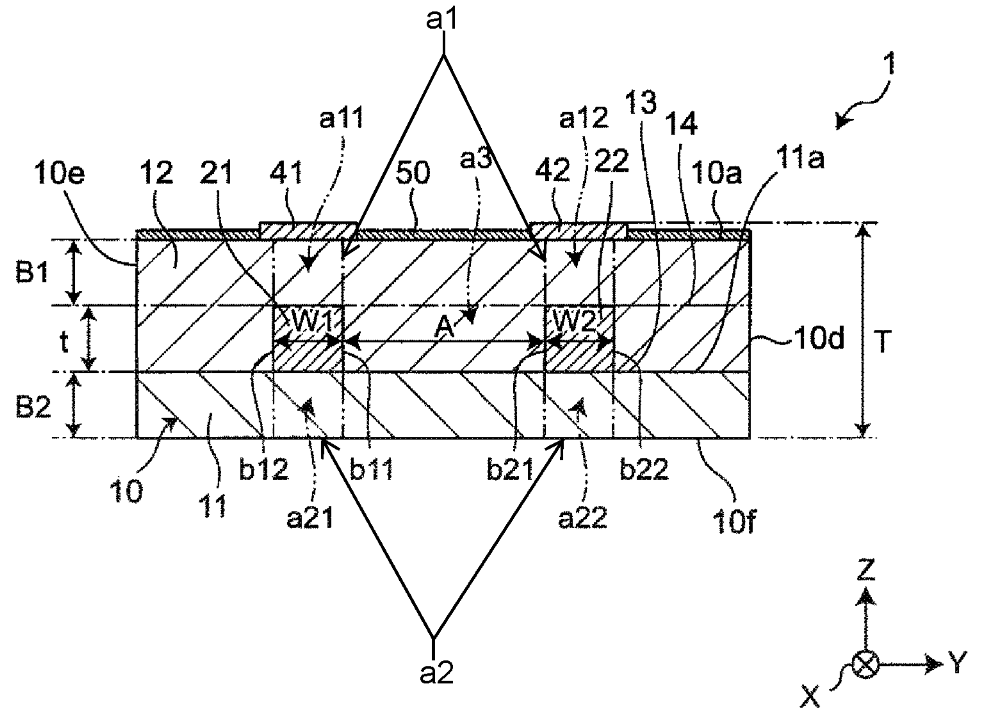
FIG. 1C is a sectional view taken along line B-B in FIG. 1A.

FIG. 1C is a sectional view taken along line B-B in FIG. 1A. The cross section taken along line B-B in FIG. 1A is a cross section that is parallel to a YZ plane formed when cutting the inductor array component 1 along the width direction (Y direction) in the center of the inductor array component 1 in the length direction (X direction) when the inductor array component 1 is viewed in the Z direction.

As illustrated in FIG. 1C, the element body 10 includes a first region a1, that includes a region a11 or a region a12, and is located on a first side (positive Z direction) of the first straight wiring line 21 or the second straight wiring line 22 in a direction normal to the first plane 13, a second region a2, that includes a region a21 or a region a22, and is located on a second side (negative Z direction) of the first straight wiring line 21 or the second straight wiring line 22 in a direction normal to the first plane 13, and a third region a3 that is located between the first straight wiring line 21 and the second straight wiring line 22. The first region a1, the second region a2, and the third region a3 are regions located in the cross section illustrated in FIG. 1C. Furthermore, the first region a1, the second region a2, and the third region a3 are regions through which magnetic flux, which is generated by a current flowing along the first straight wiring line 21 and the second straight wiring line 22, mainly flows. The magnetic flux flows in the Y direction in the first region a1 and the second region a2 and the magnetic flux flows in the Z direction in the third region a3.

The first plane 13 is the same as the plane on which the first straight wiring line 21 and the second straight wiring line 22 are arranged, is a plane inside the element body 10 that is parallel to an XY plane, and corresponds to the upper surface 11*a* of the first magnetic layer 11 in the first embodiment.

The first side is the upper side (positive Z direction side) in the direction normal to the first plane 13 on which the first straight wiring line 21 and the second straight wiring line 22 are arranged. The second side is the lower side (negative Z direction side) in the direction normal to the first plane 13 on which the first straight wiring line 21 and the second straight wiring line 22 are arranged.

The first region a1 is located on the first side of the first straight wiring line 21 or the second straight wiring line 22 in the direction normal to the first plane 13. Specifically, the first region a1 is a region a11 inside the element body 10 that is located directly above the first straight wiring line 21 or a region a12 inside the element body 10 located directly above the second straight wiring line 22. In other words, the region a11 is a region surrounded by a second plane 14, the first main surface 10*a* of the element body 10, and lines along which a first inner surface b11 and a first outer surface b12 of the first straight wiring line 21 extend toward the first side. The region a12 is a region surrounded by the second plane 14, the first main surface 10*a* of the element body 10, and lines along which a second inner surface b21 and a second outer surface b22 of the second straight wiring line 22 extend toward the first side. The width of the region a11 corresponds to a width w1 of the first straight wiring line 21 and the width of the region a12 corresponds to a width w2 of the second straight wiring line 22.

The second region a2 is located on the second side of the first straight wiring line 21 or the second straight wiring line 22 in the direction normal to the first plane 13. Specifically, the second region a2 is a region a21 inside the element body 10 that is located directly below the first straight wiring line 21 or a region a22 inside the element body 10 located directly below the second straight wiring line 22. In other words, the region a21 is a region surrounded by the first plane 13, the second main surface 10*f* of the element body 10, and lines along which the first inner surface b11 and the first outer surface b12 extend toward the second side. The region a22 is a region surrounded by the first plane 13, the second main surface 10*f* of the element body 10, and lines along which the second inner surface b21 and the second outer surface b22 extend toward the second side. The width of the region a21 corresponds to the width w1 of the first straight wiring line 21 and the width of the region a12 corresponds to the width w2 of the second straight wiring line 22.

The third region a3 is located between the first straight wiring line 21 and the second straight wiring line 22. Specifically, the third region a3 is a region surrounded by the first and second planes 13 and 14 and the first and second inner surfaces b11 and b21. The thickness of the third region a3 corresponds to a thickness t of the first and second straight wiring lines 21 and 22.

The first and second straight wiring lines 21 and 22 have the same cross-sectional shape (substantially rectangular). The cross-sectional shapes of the first and second straight wiring lines 21 and 22 are arranged with the same orientation. Specifically, the upper and lower surfaces of the cross-sectional shapes are arranged on the same planes as each other and the side surfaces of the cross-sectional shapes are parallel to each other. The cross-sectional shapes of the first and second straight wiring lines 21 and 22 have the same dimensions as each other. In addition, the configurations of the first magnetic layer 11 and the second magnetic layer 12 in the regions surrounding the first and second straight wiring lines 21 and 22 are also the same as each other.

Therefore, in the inductor array component 1, the first region a1 and the second region a2 respectively exist on the side near the first straight wiring line 21 and on the side near the second straight wiring line 22 and are identical on both sides, and therefore, hereafter, the first region a1 and the second region a2 are described as regions on the side near the first straight wiring line 21.

Operational Effects

In the inductor array component 1, the greater one out of a magnetoresistance $R_1$ of the first region a1 and a magnetoresistance $R_2$ of the second region a2 is greater than or equal to a magnetoresistance $R_3$ of the third region a3. The magnetoresistances $R_1$ to $R_3$ can be calculated in the following way, where L, w1, and t are the length, width, and thickness of the first straight wiring line 21, respectively, B1 is the thickness of the first region a1, B2 is the thickness of the second region a2, A is the width of the third region a3, $\mu_{B1}$ is effective relative permeability of the first region a1, $\mu_{B2}$ is the effective relative permeability of the second region a2, and $\mu_A$ is the effective relative magnetic permeability of the third region a3.

$$R_1 = w1/(\mu_{B1} \times B1 \times L)$$

$$R_2 = w1/(\mu_{B2} \times B2 \times L)$$

$$R_3 = t/(\mu_A \times A \times L)$$

From the above arithmetic formulas, the greater magnetoresistance out of the magnetoresistance $R_1$ of the first region a1 and the magnetoresistance $R_2$ of the second region a2 is the magnetoresistance of the region having the smaller thickness out of the thicknesses B1 and B2 when the effective relative permeabilities of the first region a1 and the second region a2 are the same ($\mu_{B1}=\mu_{B2}$). Therefore, in such case, the magnetoresistance of the region having the smaller thickness is greater than or equal to the magnetoresistance of the third region a3.

If the magnetoresistance $R_1$ of the first region a1 and the magnetoresistance $R_2$ of the second region a2 are both smaller than the magnetoresistance $R_3$ of the third region a3, the third region a3 will become magnetically saturated before the first region a1 and the second region a2 when the current flowing through the first and second straight wiring lines 21 and 22 is increased. This means that surplus saturation flux density is secured in the first and second regions a1 and a2 and there is room to further reduce the thicknesses of the first and second magnetic layers 11 and 12 without affecting the characteristics.

On the other hand, in the inductor array component 1, at least one out of the first region a1 and the second region a2 (the one having the greater magnetoresistance) will become magnetically saturated before or at the same time as the third region a3. This means that at least one out of the first magnetic layer 11 and the second magnetic layer 12 is reduced in thickness at least up to a limit where the characteristics would be affected and thickness reduction of the inductor array component 1 may be appropriately realized in accordance with the width A of the third region a3. Therefore, the inductor array component 1 can be effectively reduced in thickness while also taking into account the third region a3, which is located between the wiring lines (first and second straight wiring lines 21 and 22).

In the inductor array component 1, $R_1$ and $R_2$ are preferably greater than $R_3$, which means that in this case both the first magnetic layer 11 and the second magnetic layer 12 are reduced in thickness at least up to the limit where the characteristics would be affected.

As described above, the magnitudes of the magnetoresistances of the first to third regions a1 to a3 are calculated using the effective relative magnetic permeabilities of the first to third regions a1 to a3, the lengths along which the magnetic flux passes (more specifically, the width w1 for the first and second regions a1 and a2 and the thickness t for the third region a3) and the cross-sectional areas through which the magnetic flux passes (more specifically, the products of the length L and the thicknesses B1 and B2 for the first and second regions a1 and a2 and the product of the length L and the thickness A for the third region). The effective relative magnetic permeabilities of the first to third regions a1 to a3 can be calculated from the materials of the first to third regions a1 to a3, for example. However, it is sufficient to determine the relative relationship between the magnetoresistances, and therefore if the first to third regions a1 to a3 essentially consist of a single layer or are composed of the same material, it is sufficient to just compare the cross-sectional areas without considering the effective relative magnetic permeabilities.

The widths of the first to third regions a1 to a3 are the lengths of the first to third regions a1 to a3 in the Y direction. The thicknesses of the first to third regions a1 to a3 are the lengths of the first to third regions a1 to a3 in the Z direction.

When B1 is the thickness of the first region a1, B2 is the thickness of the second region a2, A is the width of the third region a3, $\mu_{B1}$ is the effective relative magnetic permeability of the first region a1, $\mu_{B2}$ is the effective relative magnetic permeability of the second region a2, $\mu_A$ is the effective relative magnetic permeability of the third region a3, T is the thickness of the inductor array component 1, w is a width which is not smaller one out of the width of the first straight wiring line 21 and the width of the second straight wiring line 22, and t is a thickness which is not smaller one out of the thickness of the first straight wiring line 21 and the thickness of the second straight wiring line 22, it is preferable that when $B1 \le (\mu_{B2}/\mu_{B1}) \times B2$, $$B1 \le \frac{w}{t} \times \frac{\mu_A}{\mu_{B1}} \times A \qquad \text{formula (1)}$$

be satisfied, when $B1 > (\mu_{B2}/\mu_{B1}) \times B2$ $$B2 \le \frac{w}{t} \times \frac{\mu_A}{\mu_{B2}} \times A \qquad \text{formula (2)}$$

be satisfied, and that $$\frac{T}{10} \times \frac{1}{2} \le B1 \text{ and } \frac{T}{10} \times \frac{1}{2} \le B2 \qquad \text{formula (3)}$$

be satisfied in both cases.

The thickness B1 of the first region a is the thickness of the first region a1 in the Z direction in the cross section of the inductor array component 1 illustrated in FIG. 1C. The thickness B1 of the first region a1 is the length between the second plane 14 and the upper surface of the second magnetic layer 12 (first main surface 10*a* of element body 10).

The thickness B2 of the second region a2 is the thickness of the second region a2 in the Z direction in the cross section of the inductor array component 1 illustrated in FIG. 1C. The thickness B2 of the second region a2 is the length between the first plane 13 and the lower surface of the first magnetic layer 11 (second main surface 10*f* of element body 10).

The width A of the third region a3 is the width of the third region a3 in the Y direction in the cross section of the inductor array component 1 illustrated in FIG. 1C. The width A of the third region a3 is the length of the third region a3 between the first plane 13 and the second plane 14.

A thickness T of the inductor array component 1 is the maximum thickness of the inductor array component 1 in the Z direction. In FIG. 1C, the thickness T of the inductor array component 1 corresponds to a thickness in the Z direction from the second main surface 10*f* of the element body 10 up to the first outer terminal 41 or the second outer terminal 42.

The width w of the straight wiring lines is taken to be not the smaller width out of the width w1 of the first straight wiring line 21 and the width w2 of the second straight wiring line 22. The width w1 of the first straight wiring line 21 is the maximum width of the first straight wiring line 21 in the Y direction in the cross section of the inductor array component 1 illustrated in FIG. 1C. The width w2 of the second straight wiring line 22 is the maximum width of the second straight wiring line 22 in the Y direction in the cross section of the inductor array component 1 illustrated in FIG. 1C.

The thickness t of the straight wiring lines is taken to be not the smaller thickness out of a thickness t1 of the first straight wiring line 21 and a thickness t2 of the second straight wiring line 22. The thickness t1 of the first straight wiring line 21 is the maximum width of the first straight wiring line 21 in the Z direction in the cross section of the inductor array component 1 illustrated in FIG. 1C. The thickness t2 of the second straight wiring line 22 is the maximum thickness of the second straight wiring line 22 in the Z direction in the cross section of the inductor array component 1 illustrated in FIG. 1C.

In the measurements of the above dimensions, if a certain range exists in the region where the measured is taken, it is preferable that the measurement be taken at the center of the certain range. For example, in the measurement of the width A of the third region a3, there is a measurement range spanning the thickness t of the straight wiring line in the thickness direction (Z direction), and in this case, it is preferable that the dimension parallel to the width direction (Y direction) be measured at the center of the thickness t in the Z direction.

Operational Effects

By setting the thickness B1 of the first region a1 to be less than or equal to $(w/t)\times(\mu_A/\mu_{B1})\times A$ as illustrated in formula (1) or the thickness B2 of the second region a2 to be less than or equal to $(w/t)\times(\mu_A/\mu_{B2})\times A$ as illustrated in formula (2), the side having the greater magnetoresistance out of the first region a1 and the second region a2 of the element body 10 is made no thicker than necessary with little effect on the magnetic characteristics and without having a magnetoresistance that is smaller than the magnetoresistance $R_3$ of the third region a3, and consequently thickness reduction can be effectively realized.

The first region a1 or the second region a2 can be secured even taking processing variations into account by setting the thickness B1 of the first region a1 and the thickness B2 of the second region a2 to be greater than or equal to (T/10)×(½) as illustrated in formula (3). Therefore, the first and second straight wiring lines 21 and 22 can be prevented from becoming exposed and forming open magnetic paths.

It is preferable that the thickness T of the inductor array component 1 be less than or equal to 0.3 mm from the viewpoint of even more effectively reducing the thickness of the inductor array component 1. Since there is no excess thickness when the thickness T of the inductor array component 1 is set to be less than or equal to 0.3 mm, the first region a1 or the second region a2 becomes magnetically saturated more easily than the third region a3 and the effect achieved by not making a thickness larger than necessary is effectively realized. Furthermore, since the inductor array component 1 is thin, it is possible to embed the inductor array component 1 in a substrate, for example.

It is preferable that the thickness B1 of the first region a1 and the thickness B2 of the second region a2 be equal to each other, that the effective relative magnetic permeability $\mu_{B1}$ of the first region a1 and the effective relative magnetic permeability $\mu_{B2}$ of the second region a2 be equal to each other, and that both formula (1) and formula (2) be satisfied. In this case, since both the first region a1 and the second region a2 are made no thicker than necessary with little effect on the magnetic characteristics, thickness reduction can be more effectively realized.

The effective relative magnetic permeability $\mu_{B1}$ and the effective relative magnetic permeability $\mu_{B2}$ may be different from each other. For example, in the case where the first and second magnetic layers 11 and 12 are composed of a plurality of magnetic layers, at least one magnetic layer out of the plurality of layers constituting the first and second magnetic layers 11 and 12 may be composed of a different material.

As described above, it is preferable that the width w1 of the first straight wiring line 21 and the width w2 of the second straight wiring line 22 be equal to each other and that the thickness t1 of the first straight wiring line 21 and the thickness t2 of the second straight wiring line 22 be equal to each other. In this case, for both the first straight wiring line 21 and the second straight wiring line 22, the first region a1 or the second region a2 is made no thicker than necessary with little effect on the magnetic characteristics, and therefore thickness reduction can be more effectively realized.

The first region a1, the second region a2, and the third region a3 may be composed of the same magnetic material or different magnetic materials. When the first to third regions a1 to a3 are composed of the same magnetic material, the cost can be reduced and mass production is facilitated. When the first to third regions a1 to a3 are composed of the same magnetic material, the element body 10 has the same mechanical strength in the first to third regions a1 to a3. Therefore, the occurrence of bending or deformation of the inductor array component 1 can be suppressed.

Manufacturing Method

Next, an example of a method of manufacturing the inductor array component 1 will be described.

For example, in the case where a sheet stacking method is used, the method of manufacturing the inductor array component 1 includes a green sheet forming step of forming green sheets by forming wiring lines on unfired magnetic sheets, a multilayer body forming step of forming a multilayer body by stacking and pressure bonding the green sheets, and a multilayer body firing step of firing the multilayer body.

In the green sheet forming step, for example, a first green sheet is formed by forming the parts that will become the straight wiring lines 21 and 22 by applying a conductive paste, which is composed of a conductive material powder such as Ag and a binder resin containing the powder, in substantially straight line shapes using screen printing or the like on a main surface of a magnetic sheet (part that will become first magnetic layer 11) obtained by molding a magnetic paste composed of a magnetic material powder such as ferrite and a binder resin that contains the powder into a substantially sheet-like shape.

Next, a second green sheet is formed by forming the parts that will become the columnar wiring lines 31 to 34 by forming through holes, using a laser or blasting, in a magnetic sheet (part that will become second magnetic layer 12) obtained by molding the above-described magnetic paste into a substantially sheet-like shape and filling the through holes with the above-described conductive paste.

The straight wiring lines 21 and 22 may be each formed of one conductor layer on the upper surface of the insulating sheet or may be formed of a plurality of conductor layers stacked on the upper surface of the insulating sheet in a direction normal to the insulating sheet.

Next, in the multilayer body forming step, a multilayer body is formed by stacking the second green sheet on the upper surface of the first green sheet and then pressure bonding the green sheets. In the multilayer body, the conductive paste parts that will become the columnar wiring lines 31 to 34 are exposed at a surface of the multilayer body.

After that, the multilayer body is fired in the multilayer body firing step. This causes the binder resin to disperse from the first and second green sheets and become oxidized, the magnetic material powder in the magnetic paste and the conductive material powder in the conductive paste are sintered, and the first magnetic layer 11, the second magnetic layer 12, the straight wiring lines 21 and 22, and the columnar wires 31 to 34 are formed.

Next, the coating layer 50 is formed on the upper surface of the second magnetic layer 12 by applying a solder resist or the like. Through holes through which the end surfaces of the columnar wiring lines 31 to 34 and the second magnetic layer 12 are exposed are formed in regions of the coating layer 50 where the outer terminals 41 to 44 are to be formed by performing photolithography or the like.

The inductor array component 1 in which the second magnetic layer 12 is stacked on one green sheet layer has been described in this manufacturing method, but an inductor array component may instead be manufactured by stacking two or more green sheet layers.

After that, the outer terminals 41 to 44, which grow from the columnar wiring lines 31 to 34 inside the through holes of the coating layer 50, are formed by performing electroless plating. Thus, the multilayer body is formed.

As described above, the element body 10 of the inductor array component 1 is a sintered body. When the element body 10 is a sintered body, the inductor array component 1 can be easily manufactured.

Furthermore, the method of manufacturing the inductor array component 1 is not limited to the above sheet stacking method. For example, the parts that will become the straight wiring lines 21 and 22 and the columnar wiring lines 31 to 34 may be formed by directly forming metal films using sputtering, plating, or the like. In addition, the second green sheet may be formed by directly applying the magnetic paste and the conductive paste to the first green sheet as in a printing stacking method.

The inductor array component 1 has exposed portions 200 and therefore plating can be effectively used in the method of manufacturing the inductor array component 1.

More specifically, wiring lines further extend from the positions where the first and second straight wiring lines 21 and 22 are connected to the first to fourth columnar wiring lines 31 to 34 to outside the chip and these wiring lines are exposed outside the chip. In other words, the first and second straight wiring lines 21 and 22 have exposed portions 200 that are exposed to the outside from the side surfaces of the inductor array component 1 that are parallel to the stacking direction of layers of the inductor array component 1.

These wiring lines are wiring lines that are connected to power supply wiring lines when additional electrolytic plating is performed after forming the shapes of the first and second straight wiring lines 21 and 22 in the process of manufacturing the inductor array component 1. These power supply wiring lines allow the additional electrolytic plating to be easily performed on the inductor substrate at a stage before the individual inductor array components 1 are separated from each other and enable the distance between the wiring lines to be reduced. In addition, the magnetic coupling between the first and second straight wiring lines 21 and 22 can be increased by decreasing the distance between the first and second straight wiring lines 21 and 22 by performing the additional electrolytic plating.

Furthermore, since the first and second straight wiring lines 21 and 22 have the exposed portions 200, it is possible to ensure resistance to electrostatic breakdown while the inductor substrate is being processed. The thicknesses of exposed surfaces 200*a* of exposed portions 200 of the straight wiring lines 21 and 22 preferably substantially lie in a range from 45 μm up to the thicknesses of the straight wiring lines 21 and 22. With this configuration, the thicknesses of the exposed surfaces 200*a* are less than or equal to the thicknesses of the straight wiring lines 21 and 22 and as a result the relative proportions of the magnetic layers 11 and 12 can be increased and the inductance can be improved. Furthermore, the thicknesses of the exposed surfaces 200*a* are greater than or equal to 45 μm and as a result the occurrence of disconnections can be reduced. The exposed surfaces 200*a* are preferably composed of oxide films. Thus, the occurrence of short circuits between the inductor array component 1 and adjacent components can be suppressed.

Second Embodiment

Figure 2:
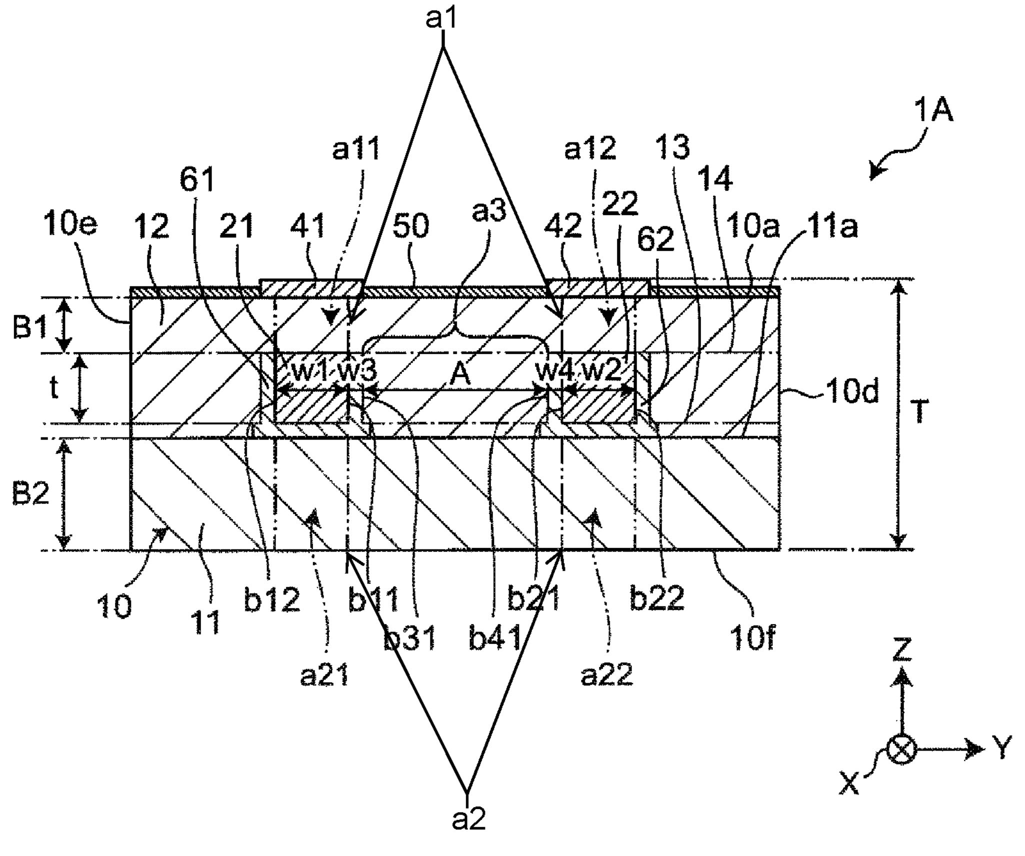
FIG. 2 is a sectional view illustrating an inductor array component according to a second embodiment.

FIG. 2 is a sectional view illustrating an inductor array component according to a second embodiment. The second embodiment differs from the first embodiment in that the second embodiment further includes insulators 61 and 62 that are arranged in at least part of the region between the first straight wiring line 21 and the second straight wiring line 22. This difference will be described below. In the second embodiment, the same symbols as in the first embodiment are used to denote constituent parts that are the same as in the first embodiment and therefore description of those constituent parts will be omitted.

As illustrated in FIG. 2, an inductor array component 1A of the second embodiment further includes a first insulator 61 and a second insulator 62 arranged in at least part of a region between the first straight wiring line 21 and the second straight wiring line 22. Specifically, the first and second straight wiring lines 21 and 22 have substantially square cross-sectional shapes. The substantially square cross sections each have an upper surface and a lower surface that face each other and a pair of side surfaces (inner side surface and outer side surface) that face each other. The first and second insulators 61 and 62 have concave shapes that cover the lower surfaces and both side surfaces of the first and second straight wiring lines 21 and 22.

When the inductor array component 1 is further provided with the first and second insulators 61 and 62 that are arranged in at least part of the region between the first and second straight wiring lines 21 and 22, the degree of insulation between the first straight wiring line 21 and the second straight wiring line 22 can be further improved. This is particularly effective when the magnetic layer 12 is composed of a resin containing a metal magnetic powder and so forth.

The first and second insulators 61 and 62 contact the side surface of at least one out of the first straight wiring line 21 and the second straight wiring line 22. In this case, the degree of insulation between the first straight wiring line 21 and the second straight wiring line 22 can be further improved. In addition, since the volume of the non-insulator part of the third region a3 of the element body 10 is secured, the inductor array component 1A in which the efficiency with which the inductance is obtained is high can be provided.

The first and second insulators 61 and 62 contact at least either of the upper surfaces and the lower surfaces of the first straight wiring line 21 and the second straight wiring line 22. The thickness of the parts of the first and second insulators 61 and 62 contacting at least either of the upper surfaces and the lower surfaces of the first straight wiring line 21 and the second straight wiring line 22 is smaller than the thickness B1 of the first region a1 and the thickness B2 of the second region a2. In this case, the degree of insulation between the first straight wiring line 21 and the second straight wiring line 22 can be further improved. Furthermore, since the volumes of the non-insulator parts of the first region a1 and the second region a2 of the element body 10 are secured, the inductor array component 1A in which the efficiency with which an inductance is obtained is high can be provided.

The second region a2 is the region a21 inside the element body 10 located directly below the first insulator 61 covering the lower surface of the first straight wiring line 21 or the region a22 inside the element body 10 located directly below the second insulator 62 covering the lower surface of the second straight wiring line 22, in other words, the region a21 is a region surrounded by the lower surface of the first insulator 61 (upper surface 11*a* of first magnetic layer 11), the second main surface 10*f* of the element body 10, and lines along which the first inner surface b11 and the first outer surface b12 extend toward the second side. The region a22 is a region surrounded by the lower surface of the second insulator 62, the second main surface 10*f* of the element body 10, and lines along which the second inner surface b21 and the second outer surface b22 extend toward the second side.

The third region a3 is a region surrounded by the first plane 13, the second plane 14, a third inner surface b31 of the first insulator 61 that covers the first inner surface b11, and a fourth inner surface b41 of the second insulator 62 that covers the second inner surface b21. Note that the insulators 61 and 62 are not included in the first to third regions a1 to a3.

The width A of the third region a3 is the length between the third inner surface b31 of the first insulator 61 and the fourth inner surface b41 of the second insulator 62 (length in Y direction). The thickness B2 of the second region a2 is the length between the lower surfaces of the first and second insulators 61 and 62 and the second main surface 10*f* (length in Z direction).

In the case where the first region a1 and the second region a2 are composed of the same material, the magnetoresistance $R_1$ of the first region a1 is greater than the magnetoresistance $R_2$ of the second region a2 since the thickness B1 of the first region a1 is smaller than the thickness B2 of the second region a2.

Widths w3 and w4 of the parts of the first and second insulators 61 and 62 that contact the first and second inner surfaces b11 and b21 of the first and second straight wiring lines 21 and 22 are smaller than the thicknesses B1 and B2 of the first and second regions and the width A of the third region. In this case, the degree of insulation between the first straight wiring line 21 and the second straight wiring line 22 can be further improved. Furthermore, since the volumes of the non-insulator parts of the first region a1 and the second region a2 of the element body 10 can be secured, the inductor array component 1A in which the efficiency with which an inductance is obtained is high can be provided.

The first and second insulators 61 and 62 may be composed of an epoxy resin, a phenolic resin, a polyimide resin, an acrylic resin, a vinyl-ether resin or a mixture of any of these resins. When the first and second insulators 61 and 62 are composed of any of the above resins (insulating organic resins), the adhesion of at least one out of the first and second straight wiring lines 21 and 22 to the element body 10 can be improved by using a predetermined insulating organic resin as the insulators 61 and 62. In addition, these insulating organic resins are softer than inorganic insulators and can therefore provide the element body 10 with flexibility and increase the mechanical strength of the inductor array component 1A against external stresses.

Manufacturing Method

For example, the inductor array component 1A can be manufactured in the following way.

First, an insulating layer is formed by applying a resin to a substrate composed of a sintered body of a magnetic material such as ferrite and then patterning the resin using photolithography or the like so that portions corresponding to the lower surface parts of the insulators 61 and 62 remain. Next, the straight wiring lines 21 and 22 are formed on the patterned insulating layer using a SAP method or the like. Next, an insulating layer is formed by applying a resin so as to cover the straight wiring lines 21 and 22 and then patterning the resin using photolithography or the like so that the insulating layer only remains around the peripheries of the straight wiring lines 21 and 22. Next, the patterned insulating layer is shaved down by performing laser processing, grinding, polishing, and so forth so as to expose the upper surfaces of the straight wiring lines 21 and 22. Thus, the insulators 61 and 62 are formed. The insulators 61 and 62 may be formed using a resin electro-deposition method.

Next, the columnar wiring lines 31 to 34 are formed on the exposed upper surfaces of the straight wiring lines 21 and 22 using a SAP method or the like. Next, a magnetic resin sheet composed of a resin containing a magnetic material is pressure bonded onto the base material on which the columnar wiring lines 31 to 34 have been formed, and the magnetic resin sheet is shaved down by grinding, polishing, and so forth so as to expose the columnar wiring lines 31 to 34. Thus, the second magnetic layer 12 is formed. Next, the coating layer 50 and the outer terminals 41 to 44 are formed in a similar manner to as in the first embodiment. In addition, the lower surface side of the substrate is shaved down by being subjected to grinding, polishing, or the like thereby forming the first magnetic layer 11, and the inductor array component 1A is thus completed. Note that rather than being a substrate composed of a ferrite sintered body, the first magnetic layer 11 may be formed of a magnetic resin sheet similarly to the second magnetic layer.

The present disclosure is not limited to the above-described embodiments and design changes can be made within a range that does not depart from the gist of the present disclosure. In addition, the characteristic features of the first and second embodiments may be combined with each other in various ways. For example, the inductor array component 1A of the second embodiment may include an element body composed of a ferrite sintered body.

While some embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. An inductor array component comprising:

an element body; and a first straight wiring line and a second straight wiring line that are arranged on the same plane inside the element body;

wherein the element body includes a first region that is located on a first side of the first straight wiring line or the second straight wiring line in a normal direction that is normal to the plane, a second region that is located on a second side of the first straight wiring line or the second straight wiring line in the normal direction that is normal to the plane, and a third region that is located between the first straight wiring line and the second straight wiring line, and the greater one out of a magnetoresistance of the first region and a magnetoresistance of the second region is greater than or equal to a magnetoresistance of the third region, the first straight wiring line and the second straight wiring line have top surfaces facing the first region, bottom surfaces facing the second region, and inner side surfaces facing the third region in a cross section perpendicular to the extending direction of the first straight wiring line and the second straight wiring line, an insulator is arranged in contact with at least one of the top surfaces, the bottom surfaces and the inner side surfaces, the insulator is in contact with a region other than the highest magnetoresistance region among the magnetoresistance of the first region, the magnetoresistance of the second region, and the magnetoresistance of the third region.

2. The inductor array component according to claim 1, wherein when B1 is a thickness of the first region, B2 is a thickness of the second region, A is a width of the third region, $\mu_{B1}$ is an effective relative magnetic permeability of the first region, $\mu_{B2}$ is an effective relative magnetic permeability of the second region, $\mu_A$ is an effective relative magnetic permeability of the third region, T is a thickness of the inductor array component, w is a width which is not smaller one out of the width of the first straight wiring line and the width of the second straight wiring line, and t is a thickness which is not smaller one out of the thickness of the first straight wiring line and the thickness of the second straight wiring line, when $B1 \leq (\mu_{B2}/\mu_{B1}) \times B2$, $$B1 \leq \frac{w}{t} \times \frac{\mu_A}{\mu_{B1}} \times A \quad \text{formula (1)}$$

formula (1) is satisfied, when $B1 > (\mu_{B2}/\mu_{B1}) \times B2$, $$B2 \leq \frac{w}{t} \times \frac{\mu_A}{\mu_{B2}} \times A \quad \text{formula (2)}$$

is satisfied, and in both cases, $$\frac{T}{10} \times \frac{1}{2} \leq B1 \text{ and } \frac{T}{10} \times \frac{1}{2} \leq B2 \quad \text{formula (3)}$$

are satisfied.

3. The inductor array component according to claim 2, wherein the thickness T of the inductor array component is less than or equal to 0.3 mm.

4. The inductor array component according to claim 2, wherein the thickness B1 of the first region and the thickness B2 of the second region are equal to each other, the effective relative magnetic permeability $\mu_{B1}$ of the first region and the effective relative magnetic permeability $\mu_{B2}$ of the second region are equal to each other, and both formula (1) and formula (2) are satisfied.

5. The inductor array component according to claim 2, wherein the width of the first straight wiring line and the width of the second straight wiring line are equal to each other and the thickness of the first straight wiring line and the thickness of the second straight wiring line are equal to each other.

6. The inductor array component according to claim 1, further comprising:

the insulator that is arranged in at least part of a region between the first straight wiring line and the second straight wiring line.

7. The inductor array component according to claim 6, wherein the first straight wiring line and the second straight wiring line have side surfaces that face each other, the insulator contacts the side surface of at least one out of the first straight wiring line and the second straight wiring line, and a width of the part of the insulator that contacts the side surface is smaller than the width of the third region.

8. The inductor array component according to claim 6, wherein the first straight wiring line and the second straight wiring line each have an upper surface and a lower surface, the insulator contacts at least one out of the upper surface and the lower surface, and a thickness of the part of the insulator that contacts the at least one out of the upper surface and the lower surface is smaller than the thickness B1 of the first region and the thickness B2 of the second region.

9. The inductor array component according to claim 6, wherein the insulator is composed of an epoxy resin, a phenolic resin, a polyimide resin, an acrylic resin, a vinyl ether resin or a mixture of any of these resins.

10. The inductor array component according to claim 1, wherein the first region, the second region, and the third region are composed of the same magnetic material.

11. The inductor array component according to claim 1, wherein the first straight wiring line and the second straight wiring line each comprises a plurality of conductor layers that are stacked in the normal direction.

12. The inductor array component according to claim 1, further comprising:

a coating layer on a main surface of the element body.

13. The inductor array component according to claim 1, further comprising:

an outer terminal on a main surface of the element body;

wherein the outer terminal is composed of at least one out of Cu, Ag, Ni, Au, and Sn or an alloy of any of these metals.

14. The inductor array component according to claim 1, wherein the element body is a sintered body.

15. The inductor array component according to claim 1, wherein the element body includes a resin and a magnetic powder contained in the resin.

16. The inductor array component according to claim 15, wherein the element body further includes a non-magnetic powder composed of an insulating material.

17. The inductor array component according to claim 15, wherein the magnetic powder includes a ferrite powder.

18. The inductor array component according to claim 15, wherein the resin is composed of at least one out of an epoxy resin and an acrylic resin.

19. The inductor array component according to claim 3, wherein the thickness B1 of the first region and the thickness B2 of the second region are equal to each other, the effective relative magnetic permeability $\mu_{B1}$ of the first region and the effective relative magnetic permeability $\mu_{B2}$ of the second region are equal to each other, and both formula (1) and formula (2) are satisfied.

20. The inductor array component according to claim 3, wherein the width of the first straight wiring line and the width of the second straight wiring line are equal to each other and the thickness of the first straight wiring line and the thickness of the second straight wiring line are equal to each other.

* * * * *